United States Patent

Yamamoto

[11] 4,195,250
[45] Mar. 25, 1980

[54] AUTOMATIC MEASURING AND TOOL POSITION COMPENSATING SYSTEM FOR A NUMERICALLY CONTROLLED MACHINE TOOL

[75] Inventor: Tamotsu Yamamoto, Sagamihara, Japan

[73] Assignee: Ikegai Tekko Kabushiki Kaisha, Tokyo, Japan

[21] Appl. No.: 855,520

[22] Filed: Nov. 28, 1977

[30] Foreign Application Priority Data

Dec. 8, 1976 [JP] Japan ............................... 51-147386
Jul. 8, 1977 [JP] Japan ............................ 52-90538[U]

[51] Int. Cl.$^2$ ............................................. G05B 13/00
[52] U.S. Cl. ................................... 318/561; 318/572; 318/626; 318/632; 318/634
[58] Field of Search ............... 318/561, 572, 626, 632, 318/634; 51/165.87, 165.88; 364/105

[56] References Cited

U.S. PATENT DOCUMENTS

| | | | |
|---|---|---|---|
| 3,605,531 | 9/1971 | Izumi et al. ........................... | 318/632 |
| 3,914,678 | 10/1975 | Chynoweth et al. ................. | 318/561 |
| 4,061,952 | 12/1977 | Dinsdale et al. ...................... | 318/561 |
| 4,095,377 | 6/1978 | Sugita ................................. | 51/165.88 |

Primary Examiner—B. Dobeck
Assistant Examiner—Eugene S. Indyk
Attorney, Agent, or Firm—Ladas, Parry, Von Gehr, Goldsmith & Deschamps

[57] ABSTRACT

In an automatic measuring apparatus and method for a numerically controlled machine tool, the dimension of a stylus secured to a cross slide and a desired dimension between two opposite points on a workpiece to be measured are inputted into an automatic measuring device in advance, the cross slide is moved under numerical control to bring the stylus into contact with the two points and to remove the stylus therefrom, and measurement of the amount of movement of the cross slide is started when the stylus leaves from one of the two points and the measurement is ended when the stylus leaves from the other point. The measurement value thus obtained, the dimension of the stylus and the desired dimension are subjected to addition and subtraction, thereby to automatically measure the actual dimension between the two points, and the difference between this actual dimension and the desired dimension.

5 Claims, 15 Drawing Figures

AUTOMATIC MEASURING AND TOOL POSITION COMPENSATING SYSTEM FOR A NUMERICALLY CONTROLLED MACHINE TOOL

BACKGROUND OF THE INVENTION

This invention relates to numerically controlled machine tools, and more particularly to an automatic measuring method for such a machine tool and a device for practicing the method.

A variety of methods and devices for measuring the outside diameter, the inside diameter, the length, etc. of a workpiece have been proposed in the art. The present applicant has proposed a novel automatic measuring device under Japanese Patent Application No. 61212/1973. This device will now be described with reference to FIG. 11.

Figure 11:
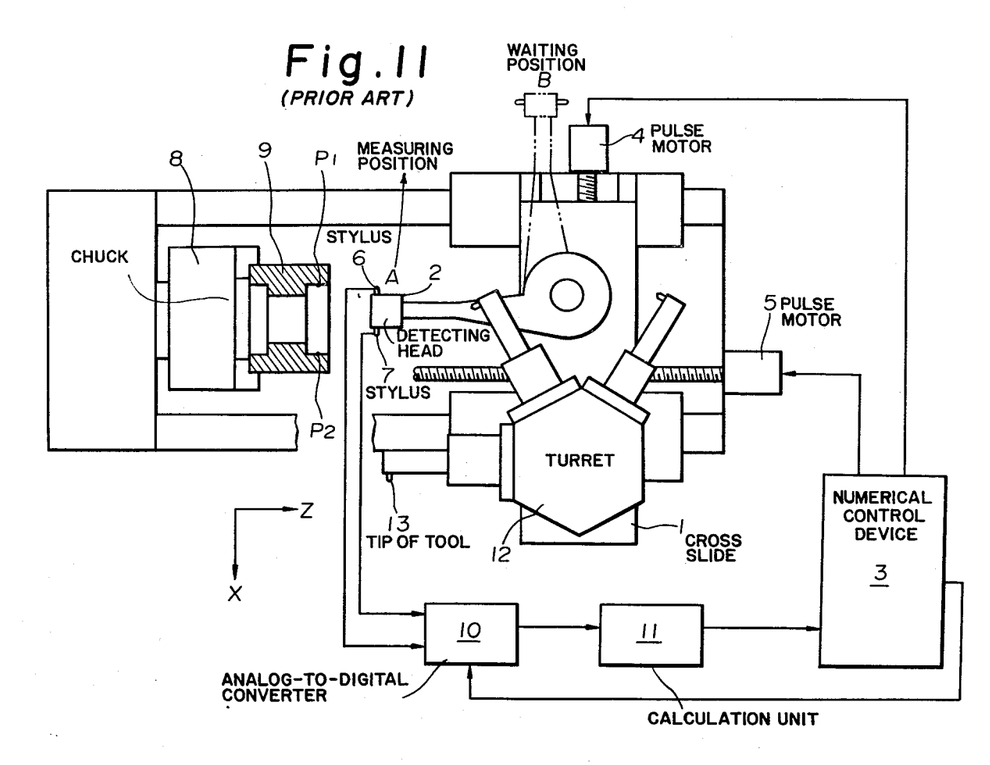
FIG. 11 is a block diagram showing one example of a conventional automatic measuring device in a numerical control turret lathe.

A detecting head 2 is provided on the cross slide 1 of a numerically controlled turret lathe. The detecting head 2 can be set aside by rotating it from the measuring position A for measuring to the waiting position B for machining. The cross slide 1 are moved by pulse motors 4 and 5 which is driven by numerical information inputted into a numerical control device 3 so that two differential transformer type sensors 6 and 7 provided on the detecting head 2 in the measuring position A are allowed to alternately come in contact with two points $P_1$ and $P_2$ which are opposite to each other along a diameter to be measured of a workpiece 9 held by a chunk 8 at the end of the main spindle of the lathe, thereby to detect the deviations of the workpiece from the desired dimension. These deviations are inputted into a calculation unit 11 through an analog-to-digital converter 10 thereby to obtain the sum of the deviations and the mean value of the deviations, which are converted into tool position compensating data for the tip of the tool 13 which is secured to the turret 12, the data being applied to the numerical control device 3.

As is apparent from the above description, in the automatic measuring device, the two styluses, i.e., the differential transformer type sensors 6 and 7 are alternately brought into contact with the two points $P_1$ and $P_2$ opposite to each other along the relevant diameter of the workpiece, whereby the mean value of the deviations between the desired value and the actual value obtained by the styluses 6 and 7 is employed as the tool position compensating data. Therefore, with the automatic measuring device described above, the measurement can be achieved independently of the displacement of the main spindle due to the thermal displacement of the machine tool, and also the non-coincidence of the machine coordinates with the program coordinates.

However, the automatic measuring device still suffers from the following disadvantages: Since the positioning accuracy on numerical control of the cross slide 1 is employed as the reference in measurement, the positioning accuracy, i.e., the measurement accuracy is liable to be affected by heat generation of the pulse motors 4 and 5 adapted to move the cross slide 1 and by the zigzag motion of the cross slide. Furthermore, as the detecting head 2 employs the differential transformer type sensors 6 and 7, the detecting head is elastically deformed by its contact pressure applied to the workpiece. In addition, it is impossible for the automatic measuring device to measure the diameter of a relatively small hole.

SUMMARY OF THE INVENTION

Accordingly, the first object of this invention is to provide in an automatic measuring method for a numerically controlled machine tool comprising the steps of inputting the dimension of a stylus secured to a stylus head and a desired dimension of a workpiece to be machined to a count control circuit, moving the stylus head under numerical control bring the stylus alternately brought into contact with two opposite points to be measured on said workpiece, and measuring the amount of movement of the stylus head effected for a period time of from an instant when the stylus leaves from one of the two points on the workpiece to an instant when the stylus leaves from the other point on the workpiece by counting a train of pulses for measurement generated by a digital the improvement wherein said measurement value is additionally inputted to said count control circuit for effecting through an addition and subtraction process the measurement of the actual dimension of said workpiece, the deviation of the actual dimension from the desired dimension of said workpiece and the compensation of the tip position of the relevant tool required for eliminating said deviation.

According to this method of this invention, measurement is not affected by the positioning accuracy of the numerically controlled machine tool, and by the displacement of a part to be measured of the workpiece. That is, the actual dimension can be measured with high accuracy, and machining can be achieved with high precision.

Another object of the invention is to provide in an automatic measuring device for a numerically controlled machine tool, which comprises: a stylus head mounted on a moving table of the machine tool such as a cross slide of a lathe and having a stylus adapted to come in contact with a workpiece to be measured and to leave therefrom; a digital type measuring device for generating a train of pulses such as a digital type linear scale for measurement in correspondence to an amount of movement of the stylus; a detection signal generating circuit for selectively generating a measurement start signal and a measurement stop signal when the stylus leaves from the workpiece; and a control circuit connected to the digital type measuring device for causing the latter to start delivering the train of pulses for measurement upon reception of the measurement start signal and for causing the same to stop delivering the train of pulses for measurement upon reception of the measurement stop signal; the improvement comprising a counter capable of receiving the dimension of the stylus and a desired dimension of the workpiece through the control circuit, of counting said train of pulses delivered to the control circuit so as to provide a count value modified by the dimension of the stylus and the desired dimension through addition and subtraction.

According to this automatic measuring device, the amount of movement of the stylus head is measured by counting the measuring pulses generated by the digital type measuring device, and therefore measurement is not affected by the positioning accuracy of the stylus head and by the zigzag motion of the stylus head; that is; the measurement can be achieved with high accuracy.

A further object of the invention is to provide an automatic measuring device in a numerical control machine tool, in which the actual dimension obtained by the counter and the desired dimension inputted in advance are subjected to calculation to obtain the deviation therebetween, this deviation is applied to a tool position compensating circuit in a numerical control device, and in a final finishing process of the workpiece the tip position of the relevant tool is automatically compensated to eliminate the deviation. With this automatic measuring device, the numerical information programmed in advance is automatically corrected with the aid of the deviation measured. Therefore, it is unnecessary to change the program every measurement and to manually input the deviation obtained through measurement, which leads to an improvement of working efficiency.

A still further object of the invention is to provide an automatic measuring device in a numerically controlled machine tool, in which the stylus head comprises: a first stylus section provided with a rod having the stylus at the front end portion and a contact pin at the rear end portion, the rod being rotatably supported at the central portion with respect to a case, and holding members for holding the rod at the neutral position thereof; and a second stylus section having an elastic secured to the case through an insulator, the elastic element having an engaging groove member adapted to engage with the contact pin with a clearance therebetween, and in which upon abutment of the stylus against the workpiece the rod is turned against the holding member, and the contact pin is brought into contact with the engaging groove member to cause the first stylus section to be electrically connected to the second stylus section, and when the stylus leaves from the workpiece, the rod is returned to the neutral position, and the contact pin is disengaged from the engaging groove member to electrically disconnect the first stylus section from the second stylus section.

Since the stylus head is constructed as described above according to the invention, measurement will never be affected by cutting oil or chips which may adhere to the surface of the workpiece; that is, the measurement can be achieved with high accuracy.

The foregoing objects and other objects as well as the characteristic features of this invention will become more apparent from the following detailed description and the appended claims when read in conjunction with the accompanying drawings.

DETAILED DESCRIPTION OF THE INVENTION

Figure 1:
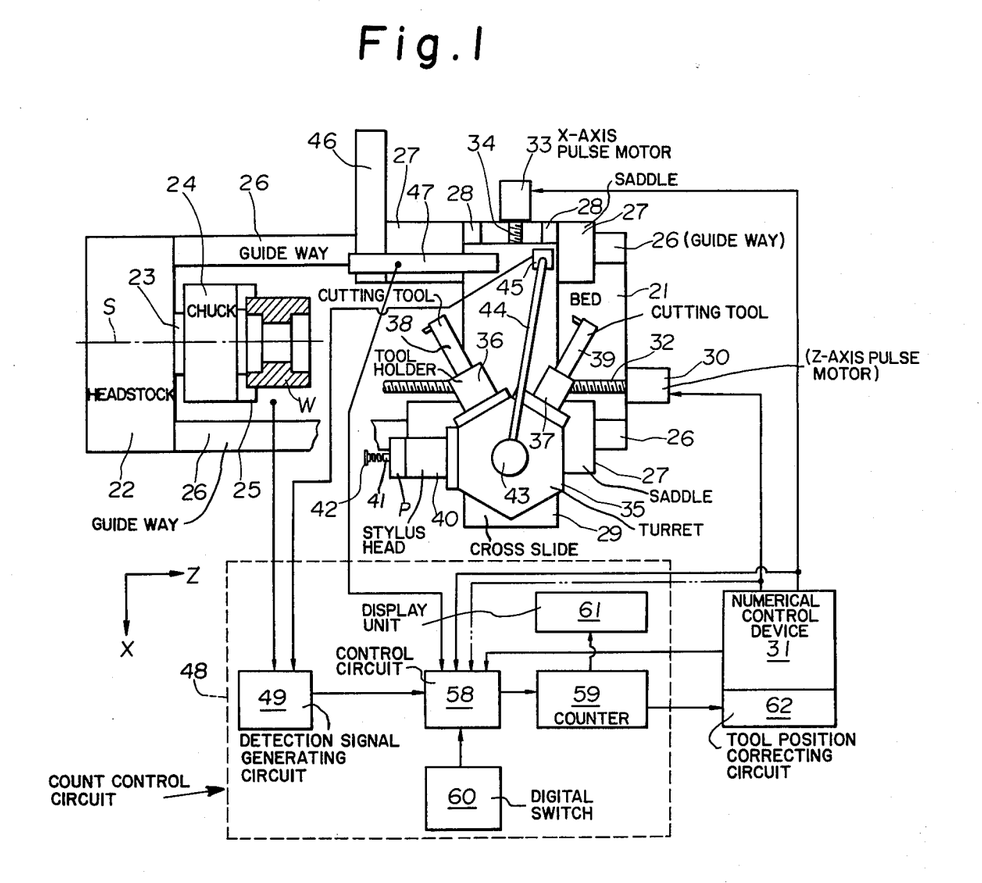
FIG. 1 is a block diagram illustrating one embodiment of this invention which is applied to a numerically controlled turret lathe.

One preferred embodiment of this invention will be described with reference to the accompanying drawings. FIG. 1 is a block diagram illustrating one example of a numerically controlled turret lathe to which the invention is applied. As shown in FIG. 1, a headstock 22 is provided on one side of a bed 21, and a main spindle 23 is rotatably supported by the head-stock 22, and furthermore a chuck 24 is fixedly secured to the front end of the main spindle 23. The chuck 24 holds a workpiece W with its plural chuck jaws 25 and is rotated with the main spindle 23 together. The bed 21 is provided with a guide way 26 thereon which is in parallel with the axis of the main spindle 23. The guide way 26 is adapted to slidably guide in a direction (hereinafter referred to as "a direction Z" when applicable) in parallel with the axis of the main spindle 23 a saddle 27 which is movably placed on the guide way 26. A cross guide way 28 is provided on the upper surface of the saddle 27 in such a manner that it is perpendicular to the axis of the main spindle 23. The cross guide way 28 is adapted to slidably guide in a direction (hereinafter referred to as "a direction X" when applicable) perpendicular to the axis of the main spindle 23 a cross slide 29 which is movably placed on the cross guide way 28. A Z-axis pulse motor 30 is provided at one end (the right end as viewed in FIG. 1) of the bed 21. This Z-axis pulse motor 30 is rotated in accordance with a numerical control command signal applied thereto from a numerical control device 31, thereby to rotate a Z-axis ball-screw 32 screwed into the saddle 27 to move the latter in the direction Z. On one end (the upper end as viewed in FIG. 1) of the saddle 27 there is provided an X-axis pulse motor 33. Similarly as in the case of the Z-axis pulse motor 30, the X-axis pulse motor 33 is rotated in accordance with a numerical control command signal applied thereto from the numerical control device 31 thereby to rotate an X-axis ball-screw 34 screwed into the cross slide 29 to move the latter in the direction X. A turret 35 is provided at a predetermined position on the cross slide 29. The turret 35 is indexed by being rotated about a shaft (not shown) perpendicular to the upper surface of the cross slide 29 in response to a command signal from the numerical control device 31. The turret 35 has a plurality of tool holders 36 and 37 on the peripheral surfaces so as to hold a plurality of cutting tools 38 and 39.

Similarly as in the case of the tool holders 36 and 37, a stylus head 40 is provided on an optional peripheral surface of the turret 35. A stylus 42 is secured to the end portion of the stylus head through an electrical insulator 41. The stylus 42 is made of an electrically conductive and non-magnetic material such as stainless steel. The tip end of stylus 42 is held by a coil spring (which is free of contact or has no frictional mechanism). The stylus 42 can be elastically deflected several millimeters in the direction X, in the direction Z, and in a direction (hereinafter referred to as "a direction Y") perpendicular to the plane X-Z by an external force. Upon release of the external force, the stylus can quickly restore to its initial position.

A slip ring 43 for transmitting an electrical signal from the stylus head 40 to the outside is provided on the rotary central shaft of the turret 35. The rotary section (not shown) of the slip ring 43 is electrically connected to one end P of the stylus 42 where the latter 42 is secured to the electrical insulator 41. The stationary side (not shown) of the slip ring 43 is connected to a detection signal generating circuit 49 through a stationary block 45 which is fixedly provided at a predetermined position on the cross slide 29 by means of a stationary pipe 44 provided over the turret 35.

A digital type linear scale 46 is fixedly provided on the saddle 27 so that when the stylus 42 is indexed and positioned at a predetermined position in such a manner that the axis of the stylus head 40 is in parallel with the direction Z, the scale is on the line extended in the direction X from the end of the stylus 42. A scale reading head 47 is fixedly secured to the cross slide 29. This scale reading head 47 moves along the digital type linear scale 46 to read the scale, thereby to produce a train of pulses corresponding to the amount of movement of the cross slide 29 i.e., the stylus head 40 in the direction X. A digital measurement device is made up of the digital type linear scale 46 and the scale reading head 47.

Figure 2:
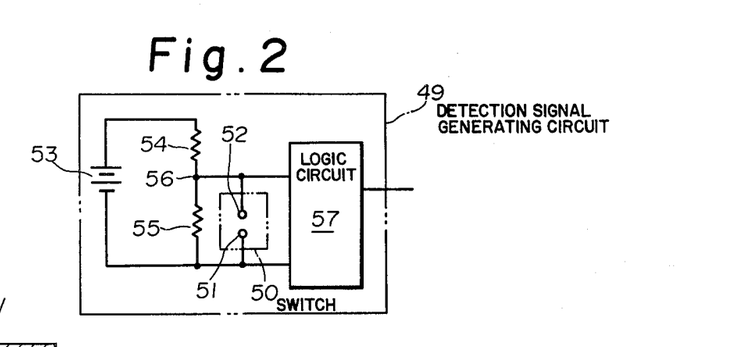
FIG. 2 is a block diagram showing a detection signal generating circuit.

Now, a count control circuit 48 will be described. In FIG. 1, reference numeral 49 is intended to designate a detection signal generating circuit which is shown in FIG. 2 in detail. One contact 51 of a switch 50 is connected to the bed 21, while the other contact 52 is connected through the aforementioned slip ring 43 to the stylus 42. A power supply 53, and resistors 54 and 55 are connected as shown in FIG. 2. Accordingly, when the stylus 42 is not in contact with the workpiece W (electrically conducting with the bed 21), the connection 56 of the resistors 54 and 55 is maintained at a predetermined voltage which is obtained by dividing the voltage of the power supply with the voltage divider formed by the resistors 54 and 55. However, when the stylus 42 is in contact with the work piece, the potential at the connection 56 is equal to the potential of the bed 21. A logic circuit 57 is so designed as to detect such a potential change thereby to produce a signal at the instant the stylus 42 leaves the workpiece W. In FIG. 1, reference numeral 58 designates a control circuit which, receiving the signal from the detection signal generating circuit 49, the command signal from the numerical control device 31, the train of pulses for the X-axis pulse motor 33, and the train of pulses from the scale reading head 47, carries out the selection of a train of pulses to be counted and the determination as to the count start and finish, and delivers a train of pulses to be counted to a counter 59 connected thereto. This counter operates to count pulses applied thereto and to be set with the aid of an external signal with an optional value by means of a digital switch 60. The counter 59 is connected to a display unit 61 for displaying the count contents thereof, and is connected to a tool position correcting circuit 62 which is a part of the numerical control device 31 so that the count contents are applied to the tool position compensating circuit 62. Thus, the count control circuit 48 is made up of the detection signal generating circuit 49, the control circuit 58, the counter 59, the digital switch 60, and the display unit 61.

The numerical control device 31 has a function of distributing pulses to the X-axis pulse motor 33 and the Z-axis pulse motor 30 so as to move the turret 35 in accordance with numerical information applied externally by means of, for instance, a perforated tape, a function of compensating the pulse distribution in accordance with information applied to the tool position compensating circuit 62, and a function of issuing the command signal for setting in the counter 59 an initial numerical value set in the digital switch 60, and the command signal for the start and stop of counting the pulses to the X-axis pulse motor 33.

The operation will be described. First, referring to FIG. 3, the operation will be described with respect to the case where, for instance in finishing an inside diameter of the workpiece W actual dimensions are measured immediately before the final finish cutting process is carried out, and deviations of the actual dimensions from the desired dimensions are employed as tool position compensating data.

Figure 3:
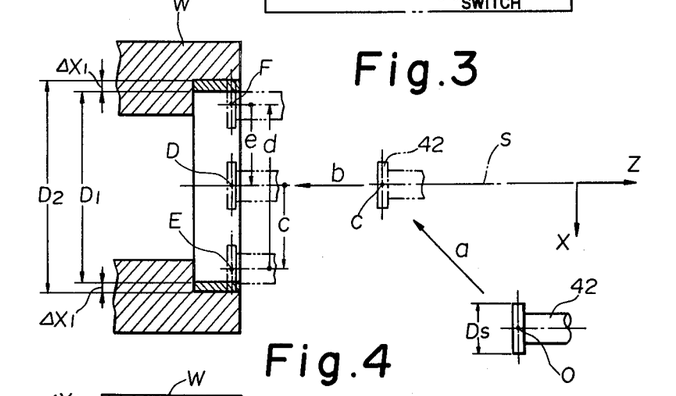
FIG. 3 is a theoretical diagram for a description of the measuring movement of a stylus head with respect to a workpiece.

In measurement, the movement of the turret 35, i.e., the stylus head 40 is similar to that of the tools 38 and 39. A program is formed in advance with the outside diameter Ds of the stylus 42 and with the final finish dimension as a desired dimension $D_2$, and these data are applied, as numerical information, to the numerical control device 31 by means of, for instance, a perforated tape, whereby the pulse distribution to the X-axis pulse motor 33 and the Z-axis pulse motor 30 is carried out by the numerical control device 31 so as to rotate these motors to effect the movement control through the respective ball-screws 34 and 32. In this connection, it is preferable that the outside diameter Ds of the stylus 42 is determined suitably for forming the program. If it is assumed that the difference between the determined outside diameter of the stylus and the actual outside diameter thereof is $\Delta Ds$, $+\Delta Ds$ is set in the counter 59 by the digital switch 60 or the like when the actual outside diameter is smaller than the determined outside diameter, and $-\Delta Ds$ is set when the actual outside diameter is larger.

Now, the measurement operation will be described in the order of steps.

First of all, the turret 35 is rotated with the aid of the command signal from the numerical control device 31, so that the stylus 42 is indexed and stopped at a predetermined position in such a manner that its axis is in parallel with the direction Z as shown in FIG. 1. Then, the control circuit 58 is instructed so that the correcting value $\Delta Ds$ and its sign of the outside diameter Ds of the stylus 42 are set in the counter 59. In this case, the contents of the counter 59 will be $+\Delta Ds$ (assuming that the actual outside diameter of the stylus 42 is smaller than the determined outside diameter thereof). Then, the pulse distribution to the X-axis pulse motor 33 and the Z-axis pulse motor 30 is effected by the numerical control device 31 so as to rotate these motors to move the turret 35 in such a manner that the stylus is moved in the direction of the arrow a so that the center O thereof comes to the point C on the axis S of the main spindle 23 and the stylus is further moved in the direction of the arrow b so that the center O is at the point D in the hole of the workpiece W which is to be measured as shown in FIG. 3. Then, the numerical control device 31 issues the command signal to the control circuit 58 so that the X-axis pulses, that is, the pulses distributed to the X-axis pulse motor 33 by the numerical control device 31 are counted, and thereafter the center O of the stylus 42 is moved to the point E, or the X coordinate $(D2-Ds)/2$, so that the outer wall of the stylus 42 is in contact with the inner wall of the hole (desired inside diameter D2) to be measured. In this operation, the end portion of the stylus 42 is elastically deformed as much as the final finish cutting margin and is maintained stopped.

In general, a diameter value instructing system is employed for the movement in the direction X of the numerical control lathe, and the least motion increment in the direction X is $\frac{1}{2}$ of the least motion increment in the direction Z. If the instruction is made to make an movement as much as Dx for instance, the amount of movement is Dx/2, but the number of pulses delivered is Dx. Accordingly, when the stylus 42 is positioned at the point E, the content of the counter 59 is $\Delta Ds + (D2-Ds)$, whereby a value corresponding to the desired dimension D2 is set in the counter 59. Now, an instruction is made so as to stop the counting of the X-axis pulses. Then, the stylus 42 is moved in the direction of the arrow d to the point F which is diametrically opposite to the point E, or to the X coordinate $-(D2-Ds)/2$. When the stylus 42 is moved for a distance of $(\Delta X1-\Delta Ds/2)$ after starting its movement along the direction d if it is assumed that the actual inside diameter immediately before the final finish cutting is D1 and that the final finish cutting margin is $\Delta X1$ in radius, the outside diameter contact point of the stylus 42 leaves the inside diameter contact point of the workpiece W, and simultaneously the detection signal generating circuit 49 produces a signal, which is applied to the control circuit 58, whereupon the control circuit 58 causes the counter 59 to count the pulses from the scale reading head 47. The number of pulses to be counted which are provided by the scale reading head 47 before the center O of the stylus 42 reaches the point F corresponds to $\{(D2-Ds)-(\Delta X1-\Delta Ds/2)\}$. Accordingly, the content of the counter 59 at this time instant is $(\Delta Ds + (D2-Ds)) - \{(D2-Ds)-(\Delta X1-\Delta Ds/2)\} = (\Delta X1 + \Delta Ds/2)$.

Then, the stylus 42 is moved from the point F in the direction of the arrow e so as to return to the point D on the axis of the main spindle 23 and it is positioned there. When the stylus 42 moves for a distance of $(\Delta X1 - Ds/2)$ after starting its movement in the direction of the arrow e, the outside diameter contact point of the stylus 42 leaves the inside diameter contact point of the workpiece W which is opposite to the aforementioned inside diameter contact point. At this instant, the detection signal generating circuit 49 generates the second signal, whereupon with the aid of this second signal thus generated the control circuit 58 causes the counter 59 to stop the counting of the pulses from the scale reading head 47. Accordingly, at this instant, the count content of the counter 59 is $(\Delta X1 + \Delta Ds/2) + (\Delta X1 - \Delta Ds/2) = 2\cdot\Delta X1$. Thus, a value to be corrected, or the final finish cutting margin is obtained. Then, the turret 35 is returned to a predetermined position, and the value for correction thus calculated and counted is inputted into the tool position compensating circuit 62. Then, the relevant finishing tool, for instance the tool 38, is indexed at the machining position by indexing the turret 35, and the final finish cutting operation is carried out. In this case, the tip position of the tool 38 is compensated as much as $2\cdot\Delta X1$ before the operation, and therefore the aimed dimension D2 can be obtained with accuracy.

Positioning the stylus 42 at the points E and F for instance is not always accurately effected mainly because the X-axis ball-screw 34 is extended because of heat generation. In addition, the center of the workpiece W is also deviated from the axis S of the main spindle 23 mainly because of the heat generation of the headstock 22. However, according to this invention, the measurement value (the final finishing margin) is not affected by these thermal displacements, that is, the measurement value can be obtained with accuracy. This will be described with reference to FIG. 4. For simplification in description, the value $\Delta Ds$ is assumed to be zero.

Figure 4:
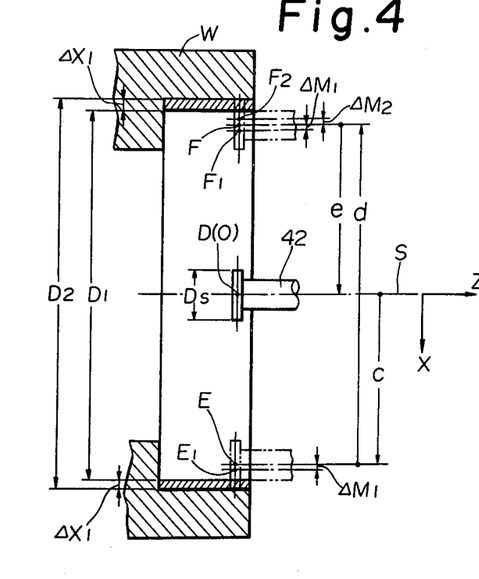
FIG. 4 is also a theoretical diagram for a description of measurement in the case where the positioning error of a numerically controlled tool machine tool is involved.

Referring to FIG. 4, similarly as in the above-described operation, the stylus head is moved so that the center O of the stylus 42 is at the point D on the axis S of the main spindle 23. At this moment, the value $\Delta Ds = 0$ has been set in the counter 59, and the numerical control device 31 applies the command signal to the control circuit 58 so that the X-axis pulses, or the pulses distributed to the X-axis pulse motor 33 by the numerical control device 31 are counted. Then, the center O of the stylus is moved along the arrow c to the point E, or the X coordinate $(D2-Ds)/2$, so that the outside of the stylus 42 is in contact with the inside of the hole (desired inside diameter D2) to be measured. In this case, the content of the counter 59 is $(D2-Ds)$ regardless of the positioning accuracy; however, it is assumed that the center O of the stylus 42 is at the point $E_1$ deviated by $\Delta M1$ from the point E because of thermal displacement or the like. Next, the control circuit 58 is instructed so that counting the X-axis pulses is suspended. Thereafter, the stylus 42 is moved in the direction of the arrow d to the point F which is diametrically opposite to the point E, or the X coordinate $-(D2-Ds)/2$, and is positioned there. When the stylus 42 moves for a distance of $(\Delta X1 + \Delta M1)$ after starting its movement, the stylus 42 leaves from the workpiece W. At this moment, the detection signal generating circuit 49 generates the signal which is applied to the control circuit 58. Accordingly, the control circuit 58 causes the counter 59 to count the pulses from the scale reading head 47 at the same moment. When positioning the stylus 42 at the point F is completed, the center 0 of the stylus 42 should be at the point $F_1$ remote by $\Delta M_1$ from the point F. However, it is assumed that the center of the stylus is at the point $F_2$ remote by $\Delta M_2$ from the point F, because of thermal disposition, etc., the number of pulses from the scale reading head 47 corresponds to $[\{(D2-Ds)-(\Delta X1+\Delta M_1)\}+\Delta M_1+\Delta M_2]$, and the content of the counter 59 is $(D2-Ds) - [\{(D2-Ds)-(\Delta X1\Delta M1)\}+\Delta M1+\Delta M2] = (\Delta X1 - \Delta M2)$.

Then, the stylus 42 is moved in the direction of the arrow e so that it is returned to the point D on the axis S of the main spindle 23 and is positioned there. When the stylus is moved for a distance of $(\Delta X1 + \Delta M_2)$ after starting its movement, the stylus 42 leaves from the contact point of the work piece W, whereupon the detection signal generating circuit 49 provides the signal again, and the control circuit 58 causes the counter 59 to stop counting the pulses from scale reading head 47. Accordingly, when the center O of the stylus 42 reaches the point D, the content of the counter is $(\Delta X1 - \Delta M_2) + (\Delta X_1 + \Delta M_2) = 2\cdot\Delta X1$, thus providing the tool position compensating data, or the final cutting finishing margin.

The constructions of another examples 40' and 49' of the stylus head and the detection signal generating circuit will be described with reference to FIGS. 5 through 10.

Figure 5:
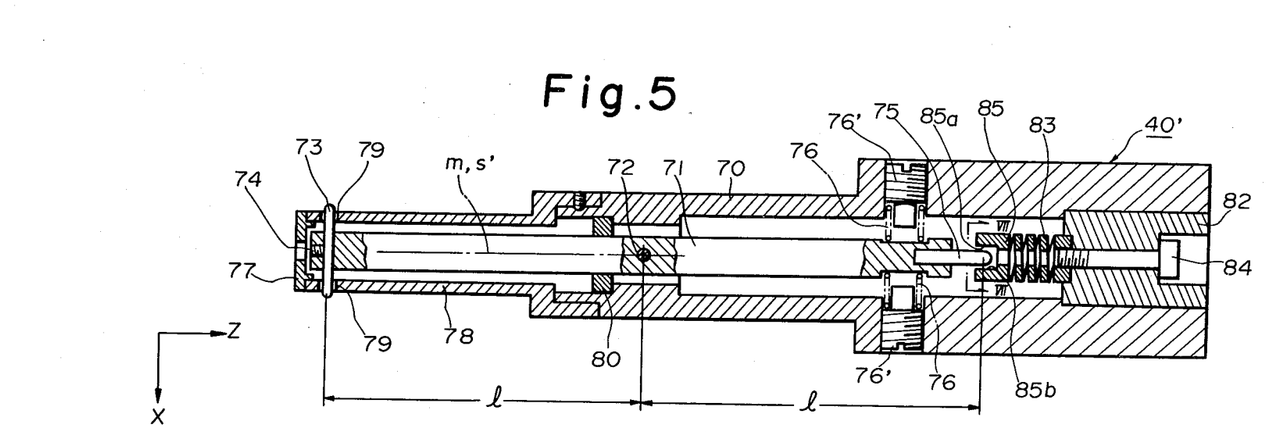
FIG. 5 is a horizontal sectional view showing one embodiment of the stylus head of this invention.
Figure 6:
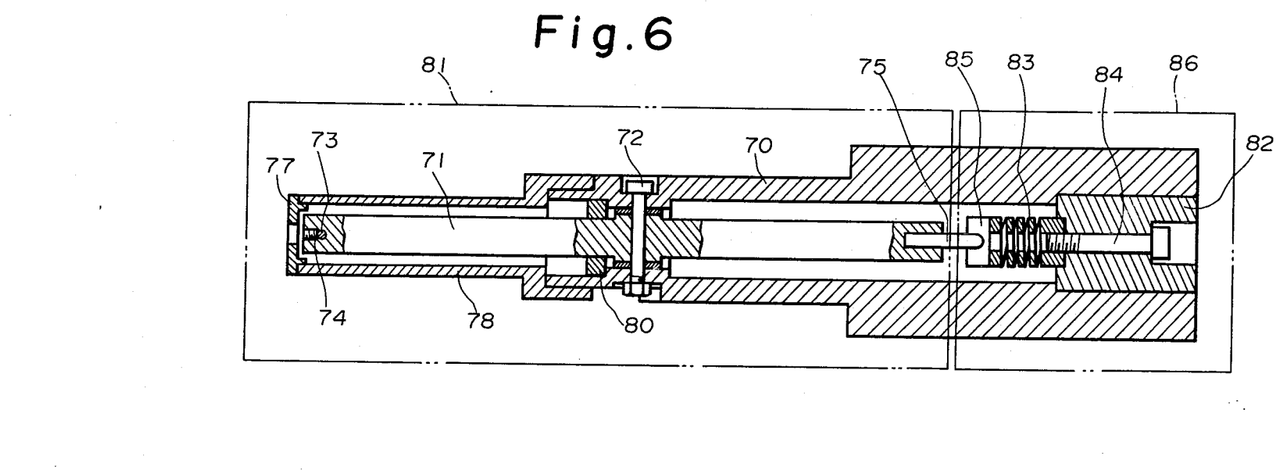
FIG. 6 is a vertical sectional view showing the stylus head shown in FIG. 5.

Referring to FIGS. 5 and 6, a case 70 is in the form of a hollow cylinder, and a rod 71 is provided in the end portion of the case 70 in such a manner that it can swing through a small angle around a frictionless pin 72 provided in the middle portion thereof. A stylus 73 is fixedly secured to the end portion of the rod 71 by means of a screw 74. The end portions of the stylus are spherical and are adapted to abut against an object to be measured. A contact pin 75 is fixedly secured to the other end portion of the rod 71. The stylus 73 and the contact pin 75 are substantially equally remote by a distance l from the pin 72. A pair of holding members 76 made up of, for instance, coil springs are arranged in the vicinity of the contact pin in the case 70 in such a manner as to elastically hold both sides of the rod 71. The elastic forces of the holding members are adjustable by adjust screw 76' screwed into the case 70, so that the axis S' of the rod 71 is in coincidence with the axis m of the case 70. A cover 78 having a cap 77 at its end opening is secured to the end portion of the case so that chips may not be wound directly on the rod 71. The stylus 73 is protruded through small holes 79 provided in the end portion of the cover 78. The diameter of each small hole 79 is such that when the stylus 73 is displaced, it will not be in contact with the hole 79. A soft seal member 80 is provided on the rod 71 in the vicinity of the pivot point 72 of the rod 71 so that the coolant or dust may not enter the case 70. The first stylus section 81 is constructed as described above.

It is considered that the above-described soft seal member 80 may obstruct the stability of the contact pin 75; however, the stability of the contact pin 75 may be considerably low as described later. The amount of displacement of the stylus 73 in the direction X is no more than ±1 mm from the axis m of the case 70, and in this case the amount of displacement of the rod 71 in the direction X is no more than 0.15 mm at the point where the soft seal member 80 is arranged. Therefore, the provision of the soft seal member 80 will not greatly impede the stability of the contact pin 75, and accordingly will not affect the measurement accuracy.

Figure 7:
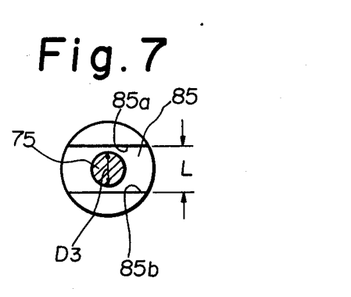
FIG. 7 is a sectional view taken along line VII—VII in FIG. 5.

On the other hand, an insulator 82 is fitted into the rear end portion of the case 70. An elastic element 83 such as a coil spring which has no contact portions and frictional mechanisms is provided on the end portion of the insulator 82. The free end portion of the elastic element 83 can be deformed elastically by an external force applied thereto to an extent of several millimeters in either direction X, Z, or Y perpendicular to the X-Z plane. Upon removal of the external force, it can quickly restore to its initial position. An engaging groove 85 the width of which is wider by about one millimeter than the diameter $D_3$ of the contact pin 75 is provided in the end surface of the free end portion of the elastic element 83 as shown in FIG. 7. The contact pin 75 is inserted into the engaging groove 85 with a clearance therebetween. In other words, when rod 71 is held in the neutral position by being elastically held with the holding members 76 provided on both side thereof, the contact pin 75 is at the intermediate position between the groove walls 85a and 85b of the engaging groove 85 and is not in contact with the engaging groove 85.

Thus, the second stylus section 86 has been constructed.

The insulator 82 is made of an electrically non-conductive synthetic resin or the like, while the remaining elements are made of electrically conductive metals. Therefore, the first stylus section 81 is electrically insulated from the second stylus 86 so far as the contact pin 75 of the first stylus section 81 is not brought into contact with the engaging groove 85 of the second stylus section 86 by the rotation of the rod 71.

The case 70 and a tightening bolt 84 are connected to the detection signal generating circuit 49' through leads 87 and 88, respectively.

Figure 9:
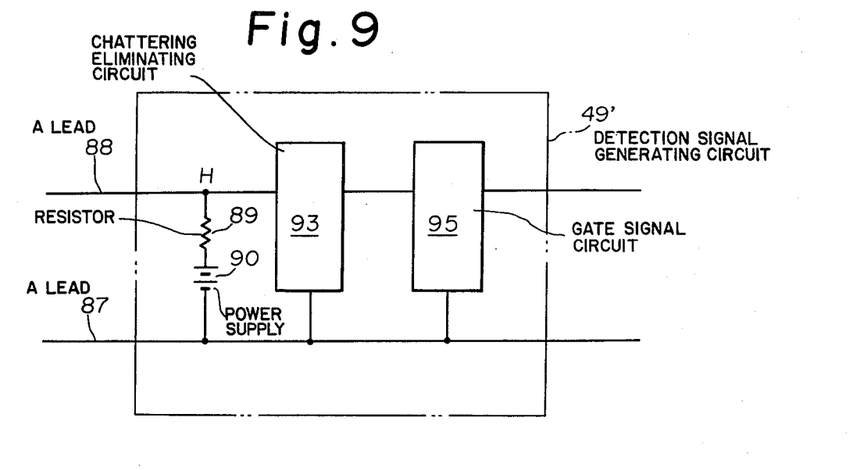
FIG. 9 is a block diagram showing another detection signal generating circuit.
Figure 10:
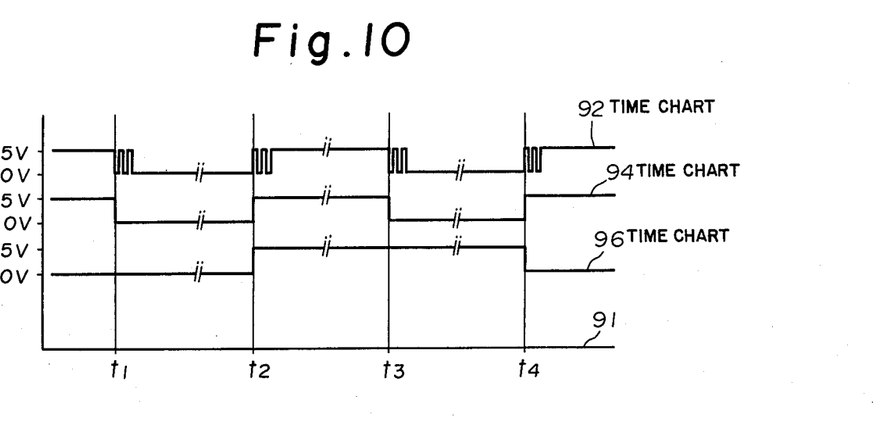
FIG. 10 shows time charts indicating signal transmission in the detection signal generating circuit shown in FIG. 9.

This detection signal generating circuit 49' will be described with reference to FIGS. 9 and 10.

A series circuit of a resistor 89 and a power supply 90 is connected between the leads 87 and 88. The connection H between the resistor 89 and the lead 88 is at 0 volt when the contact pin 75 is brought into contact with the engaging groove 75, that is, the leads 87 and 88 are short-circuited; while the connection H is at the voltage of the power supply, for instance 5 volts when the contact pin 75 is spaced apart from the engaging groove 85, that is, the former is insulated from the latter. The signal transmission observed when the contact pin 75 is respectively brought into and out of contact with the engaging groove 85 will be described with reference to time charts shown in FIG. 10, assuming that at the instants $t_1$ and $t_3$ the contact pin 75 is brought into contact with the engaging groove 85 and at the instants $t_2$ and $t_4$ the pin 75 is brought out of contact with the groove 85. At the connection H, a chattering phenomenon takes place for several tens of milliseconds immediately after the on-off operations at the instants $t_1$, $t_2$, $t_3$ and $t_4$ similarly as in the case of the ordinary electrical contact means (cf. the time chart 92). Thereafter, the voltage at the connection H is 0 volt when the contact pin is in contact with the engaging groove, and is 5 volts when the pin is out of contact with the groove. The signal including the chattering shown in the time chart 92 is applied to a chattering eliminating circuit 93, which in turn shapes the signal into a rectangular wave signal as shown in the time chart 94 which is applied to a gate signal circuit 95. The gate signal circuit 95 operates to invert its output whenever the level of the rectangular wave output of the chattering eliminating circuit 93 changes from 0 volt to 5 volts, thereby to output a signal as shown in the time chart 96. In this signal, the level becomes 5 volts immediately after the instant $t_2$, and this state is maintained unchanged until the next instant $t_4$, and then the level becomes 0 volt immediately after the instant $t_4$.

Furthermore, it is considered that the contact surfaces of the contact pin 75 and the engaging groove 85 may be damaged by electrical discharge due to dielectric breakdown caused immediately before these elements are brought into contact with each other, as a result of which the measurement accuracy is lowered. However, the necessary current is determined from the power supply 90 and the resistor 89, and a current of several tens of milliamperes is sufficient for this purpose. It is known that a current smaller than 400 mA will cause no damage to the contact surfaces through discharge, and will not lower the measurement accuracy.

The operation of the stylus head 40' will be described with reference to FIG. 8.

Similarly as in the case of the conventional stylus head, the stylus head 40' is secured onto the tool mounting surface of the turret, and the stylus 73 is allowed to abut against two points $P_3$ and $P_4$ inside of a hole to be measured of the workpiece W, the two points being opposite to each other diametrally in the direction X.

Figure 8A:
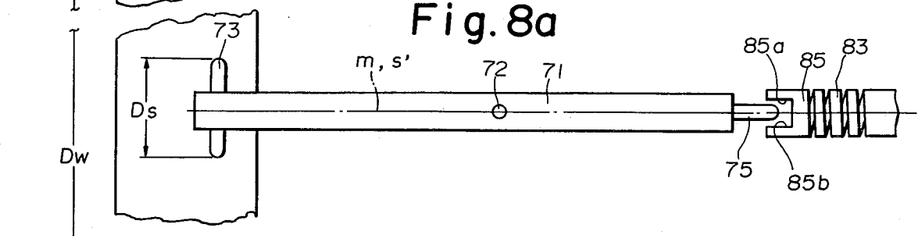
FIGS. 8a–8e are explanatory diagrams for a description of the operation, in the X-Z plane, of the stylus head shown in FIG. 5.

As shown in FIG. 8(a), first the stylus 73 is not abutted against the measuring point of the workpiece W to be measured, and the contact pin 75 is not in contact with the engaging groove 85. Then, at first the stylus 73 is caused to contact the point $P_3$ of the hole in the workpiece W. As a result, the rod 71 is slightly swung counterclockwise around the pin 72 against the elastic forces of the holding members 76, whereby the contact pin 75 is brought into contact with one groove wall 85a of the engaging groove 85. Therefore, the first stylus section 81 is electrically connected to the second stylus section 86, the potential at the connection H in the detection signal generating circuit 49' becomes zero volt, and the instant when the contact pin 75 comes into contact with the groove wall 85a is detected (cf. the time instant $t_1$ on the time axis 91 in FIG. 10). Then, the stylus 73 is removed from the point $P_3$ on the work piece W, and then is brought into contact with the other point $P_4$ thereon as shown in FIG. 8(c). As a result, the rod 71 is slightly swung clockwise around the pin 72 against the elastic forces of the holding members 76, and the contact pin 75 is therefore brought in contact with the other groove wall 85b. Accordingly, the first stylus section 81 is electrically connected to the second stylus section 86, and the potential at the connection H in the detection signal generating circuit 49' becomes zero (0) volt. Thus, the moment when the contact pin 75 is brought into contact with the other groove wall 85b (or the instant $t_3$ on the time axis 91 shown in FIG. 10) is detected. Thereafter, the stylus 73 is removed from the other point $P_4$ on the workpiece W so as to be in the initial state as shown in FIG. 8(a).

Figure 8B:
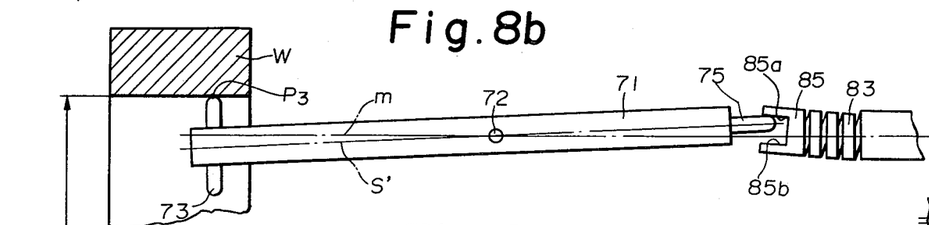
Figure 8C:
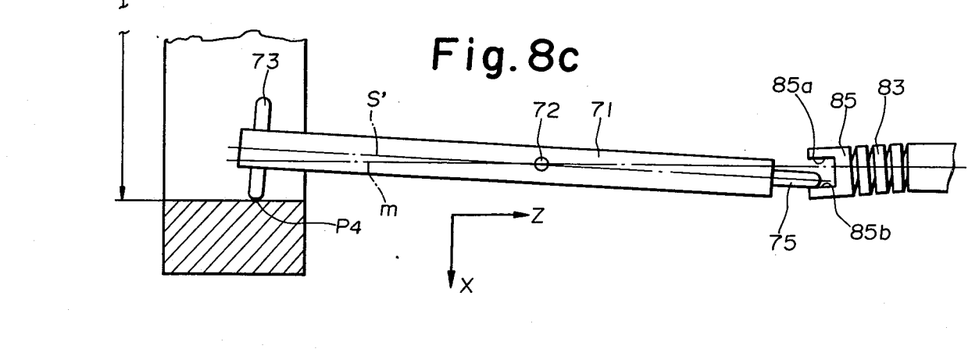
Figure 8D:
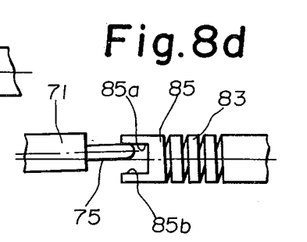

When the state of the stylus 73 is changed from its state shown in FIG. 8(b) to that shown in FIG. 8(c), that is, in the state shown in FIG. 8(d), the stylus 73 is abutted against the one point $P_3$ on the workpiece W with the aid of the elastic forces of the holding members 76, and in this case the stylus 73 exerts an abutting force of approximately 100 g to 200 g against the aforementioned point $P_3$. When the stylus 73 in this state is removed from the point $P_3$ on the workpiece W, the rod 71 rotated counterclockwise is swung around the pin 72 to return to its neutral position by the elastic forces of the holding members 76, and therefore the contact pin 75 is brought out of contact with the wall 85a of the groove 85. As a result, the first stylus section 81 is electrically disconnected from the second stylus section 86, and the potential at the connection H in the detection signal generating circuit 49' is raised to 5 volts. Thus, the moment when the contact pin 75 leaves the wall 85a of the groove (or the instant $t_2$ on the time axis 91 shown in FIG. 10) is detected.

Figure 8E:
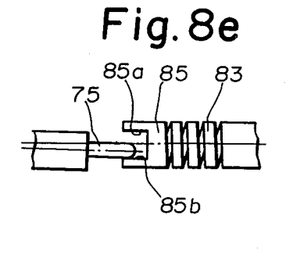

When the state of the stylus 73 is changed from its state shown in FIG. 8(c) to that shown in FIG. 8(a), or in the state shown in FIG. 8(e), the stylus 73 is abutted against the other point $P_4$ on the workpiece W with the aid of the elastic forces of the holding members 76, and in this case the stylus 73 exerts also the same abutting force of approximately 100 g to 200 g against the aforementioned point $P_4$. When the stylus 73 in this state is leaves the other point $P_4$ on the workpiece W, the rod 71 rotated clockwise is swung around the pin 72 to return to its neutral position by the elastic forces of the holding members 76, and therefore the contact pin 75 is leaves the other wall 85b of the groove 85. As a result, the first stylus section 81 is electrically disconnected from the second stylus section 86, and the potential at the connection H in the detection signal generating circuit 49' is raised to 5 volts. Thus, the moment when the contact pin 75 is leaves the other wall 85b of the groove (or the instant $t_4$ on the time axis 91 shown in FIG. 10) is detected.

As was described above, the stylus 73 is alternately abutted against the two points $P_3$ and $P_4$ inside the hole to be measured in the workpiece W, which are opposite diametrally in the direction X. Therefore, the moment when the contact pin 75 leaves the engaging groove 85 can be detected by the detection signal generating circuit 49', and the period of time from the instant $t_2$ when the contact pin 75 leaves from the wall 85a of groove 85 to the instant $t_4$ when the contact pin 75 leaves from the other wall 85b can be detected from the output signals of the gate signal circuit 95 in the detection signal generating circuit 49'. The amount of movement of the cross slide, or the stylus head 40', during this period is monitored by the digital type linear scale 46 at all times; that is, the amount of movement of the cross slide, or the stylus head 40', for the period of time from the instant when the stylus 73 leaves from the point $P_3$ on the workpiece W to the instant when the stylus 73 leaves from the point $P_4$ thereon is counted by the above-described digital type linear scale 46.

Each of the rod 71 of the first stylus section 81 and the elastic element 83 of the second stylus section 86 has its own stability to return itself to the neutral position as was described above. The accuracy of this stability will be described. It is difficult for the rod 71 to expect a high stability accuracy, because the pin 72 of the rod 71 is somewhat frictional and the soft seal material 80 is one factor obstructing the stability. However, the stability accuracy of the rod 71 may be low, for instance of 0.3 mm or less, because all that is required is that when the rod 71 returns to its neutral position, the contact pin 75 is not in contact with the two walls 85a and 85b of the engaging groove 85, and that the difference $(L-D_3)$ between the width (L) of the engaging groove 85 and the diameter $(D_3)$ of the contact pin 75 is constant. On the other hand, the stability accuracy of the elastic element 83 is extremely high, less than 1 $\mu$m, because it is in the form of a coil spring having no frictional mechanisms. Therefore, the stability accuracy of the elastic element 83 is, in general, satisfactory.

As is apparent from the above description, in the measurement according to this invention, the stylus is brought into contact with a first point on the workpiece and is then removed therefrom, and thereafter the stylus is brought into contact with a second point on the workpiece which is diametrically opposite to the first point and is then removed therefrom, so that a distance covered by the stylus head for the period of time from the instant when the stylus leaves from the first point to the instant when the stylus leaves from the second point is measured, and the value obtained by this measurement, the dimension of the stylus, and the desired dimension are subjected to calculation. Accordingly, the measurement is not affected by the positioning accuracy and zigzag motion of the moving table to which the stylus head is secured; that is, the measurement can be achieved with high accuracy. In addition, for the same reason, the measurement can be performed with high accuracy even if the center of the workpiece is somewhat deviated from the axis of the main spindle of the machine tool. Furthermore, the measurement can be achieved by detecting the instant when the stylus leaves from the contact point with the workpiece. Therefore, the measurement accuracy will not be lowered even in the case where the stylus is slightly vibrated by the vibration of the machine tool.

Furthermore, according to the invention, all that is necessary is for the stylus to come in contact with the workpiece and to leave the same. Therefore, the configuration of the stylus is not limited to a particular one. In other words, the shape of the stylus may be very simple, and therefore the stylus can be manufactured readily at a low cost. In addition, measurement of parts intricate in configuration such as in small-hole diameters, grooves in holes, grooves in walls and diameters can be readily achieved according to this invention.

Moreover, the stylus head is so designed that the contact is opened and closed in response to the operations that the stylus comes in contact with the workpiece and leaves the same, and therefore the measurement can be conducted even if the workpiece is of an electrically non-conductive material, and the accuracy in measurement is not lowered by coolant or chips on the surface. Furthermore, as the stylus head is covered with the case, the contact is protected against coolant or dust, which leads to high measurement accuracy.

What is required for obtaining the actual dimensions of the workpiece and the tool position compensating data is mainly a counter only. Accordingly, the control circuit is considerably simple as compared which the conventional one.

What is claimed is:

1. In an automatic measuring and tool position compensating method for a numerically controlled machine tool comprising the steps of putting the dimension of a stylus head and a desired dimension of a workpiece to be machined into a count control circuit, moving said stylus under numerical control to bring said stylus alternately into contact with two opposite points on a workpiece to be measured, and measuring an amount of movement of said stylus head effected for a period of time between an instant when said stylus leaves from one of said two points on said workpiece and an instant when said stylus leaves from the other point of said workpiece by counting a train of pulses for measurement generated in a digital type measuring device to provide a measurement value, the improvement comprising additionally inputting said measurement value into said count control circuit for effecting the measurement of an actual dimension, the amount of deviation of the workpiece and the required compensation of the tip position of the relevant tool through a process of addition and substraction.

2. In an automatic measuring device for a numerically controlled machine tool, which comprises a stylus head mounted on a moving table of said numerically controlled machine tool and having a stylus adapted to come in contact with a workpiece to be measured and to leave therefrom, a digital type measuring device for generating a train of pulses for measurement in correspondence to an amount of movement of said stylus, a detection signal generating circuit for selectively generating a measurement start signal and a measurement stop signal when said stylus leaves from said workpiece, and a control circuit connected with said digital type measuring device for causing said digital type measuring device to start delivering said train of pulses for measurement upon receiving said measurement start signal and for causing said digital type measuring device to stop delivering said train of pulses for measurement upon receiving said measurement stop signal, the improvement comprising a counter capable of receiving the dimension of said stylus and a desired dimension of said workpiece through said control circuit as well as being operative to count said train of pulses delivered to said control circuit so as to provide a count value modified by the dimension of said stylus along with the desired dimension through addition and subtraction.

3. An automatic measuring device in a numerically controlled machine tool according to claim 2, wherein said counter is connected with a tool position compensating circuit incorporated in a numerical control device, and wherein said tool position compensating circuit is adapted to receive therein a difference between an actual dimension of said workpiece obtained by said counter and the desired dimension thereof so as to compensate numerical information representative of an amount of movement of a relative tool programmed in advance and also to compensate automatically the tip portion of said tool to the extent of said difference in a final finishing process of said workpiece.

4. An automatic measuring device in numerically controlled machine tool according to claim 2, wherein said stylus head is provided with a stylus made of an electrically conductive and non-magnetic material and includes a tip end held by a coil spring elastically deformable by several millimeters by virtue of external force exerted on said tip end and being quickly restored to its initial position upon releasing said external force.

5. An automatic measuring device in a numerically controlled machine tool according to claim 2, wherein said stylus head comprises:
(a) a first stylus section provided with a rod having the stylus at the front end portion and a contact pin at the rear end portion, said rod being rotatably supported at the central portion with respect to a case, and holding members for holding said rod at the neutral position thereof, and
(b) a second stylus section having an elastic element secured to said case through an insulator, said elastic element having an engaging groove member adapted to engage with said contact pin with a clearance therebetween, and upon abutment of said stylus against said workpiece said rod is turned against said holding member, said contact pin being brought into contact with said engaging groove member to cause said first stylus section to be electrically connected with said second stylus section, and when said stylus leaves said workpiece, said rod is returned to the neutral position and said contact pin is disengaged from said engaging groove member is electrically disconnect said first stylus section from said second stylus section.

* * * * *